UNITED STATES PATENT OFFICE.

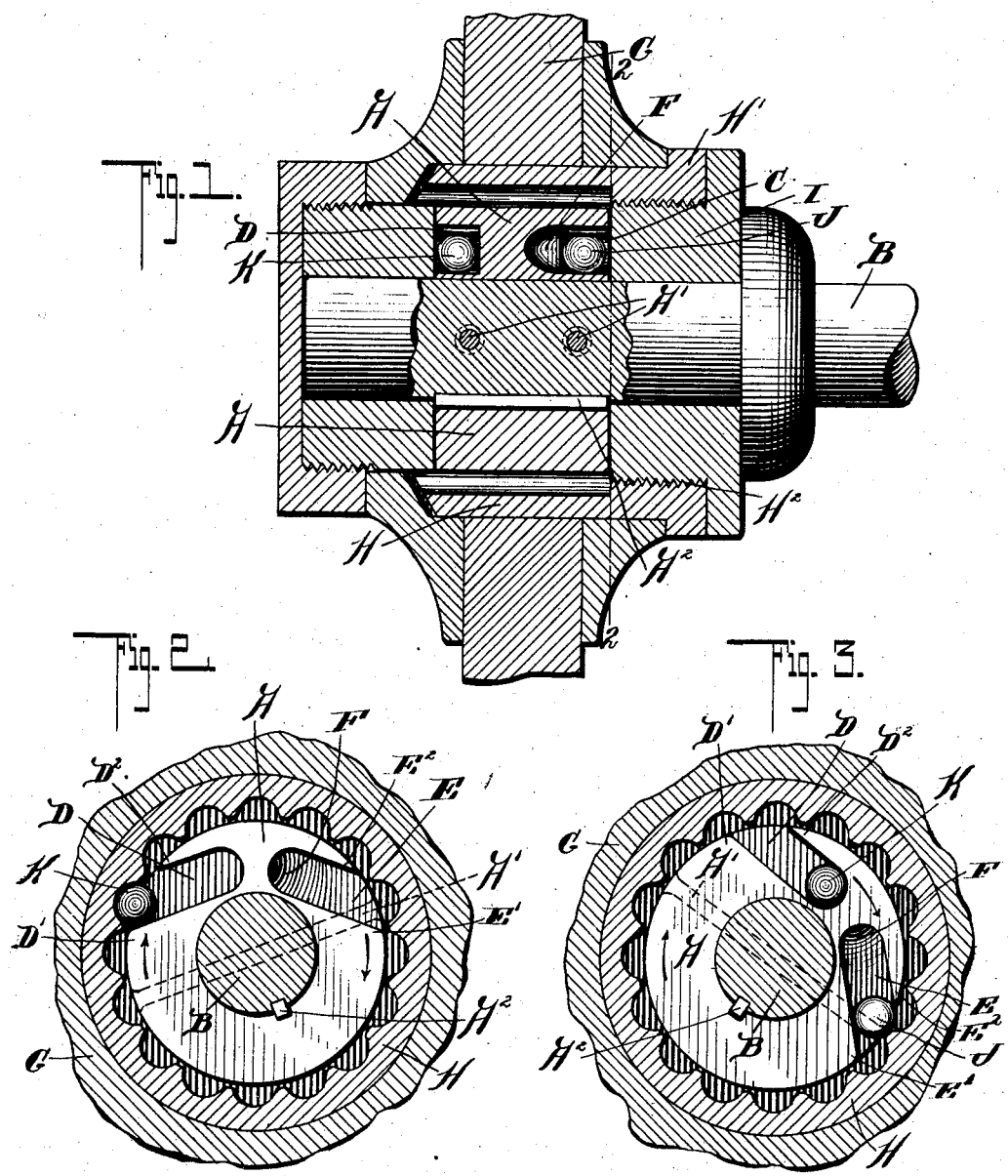

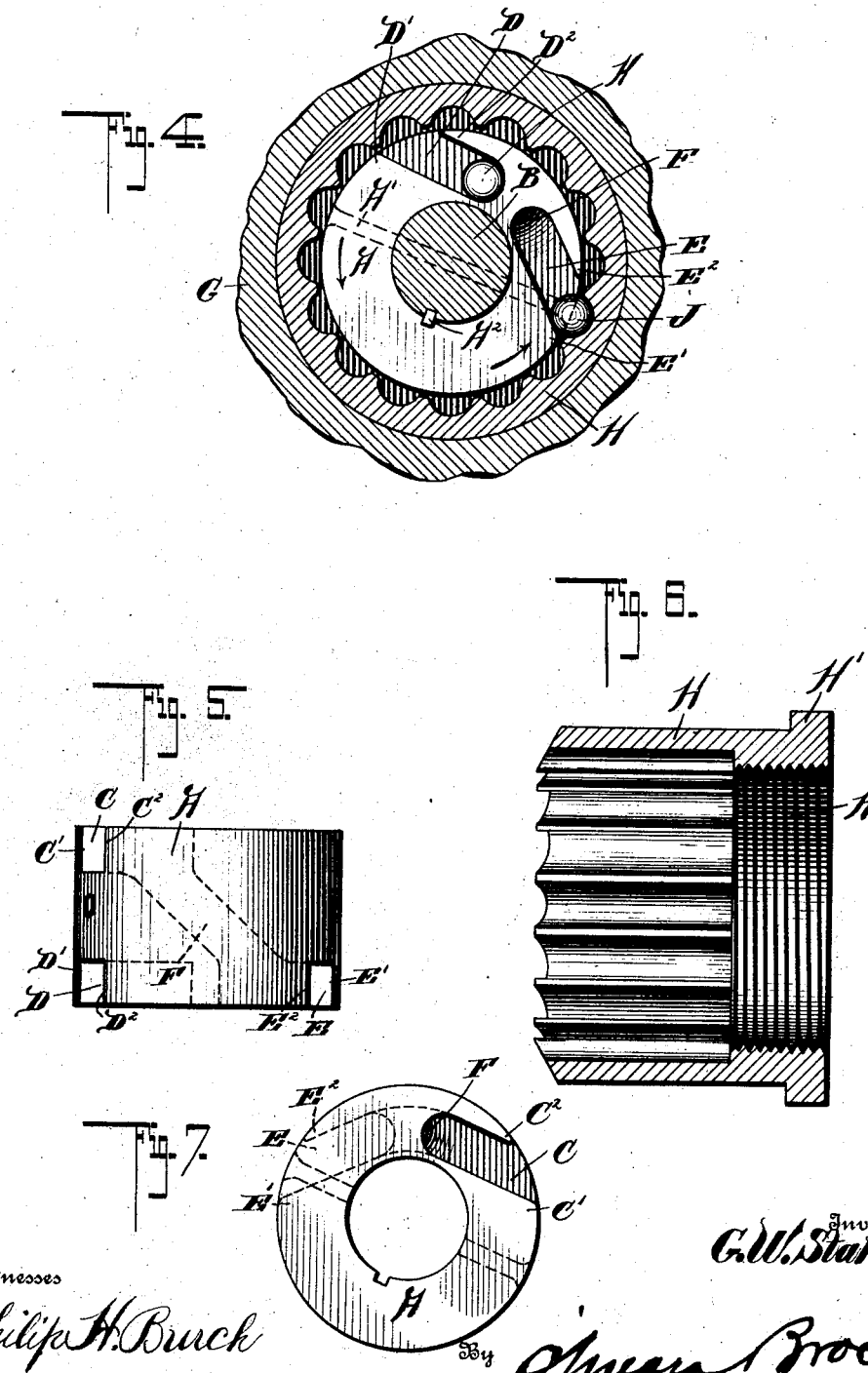

GEORGE W. STANLEY, OF LOGANSPORT, INDIANA, ASSIGNOR OF ONE-EIGHTH TO ZACHRA TAYLOR, DAWS TAYLOR, CLARK M. TAYLOR, AND JOSEPH TAYLOR, AND ONE-FOURTH TO E. D. MORGAN, ALL OF LOGANSPORT, INDIANA.

DIFFERENTIAL HUB.

997,585.  Specification of Letters Patent.  Patented July 11, 1911.

Application filed August 24, 1908. Serial No. 450,049.

*To all whom it may concern:*

Be it known that I, GEORGE W. STANLEY, a citizen of the United States, residing at Logansport, in the county of Cass and State of Indiana, have invented a new and useful Improvement in Differential Hubs, of which the following is a specification.

This invention relates to differential hubs especially adapted to be used on automobiles, and more particularly to ball and socket locking devices for the same, the object being to provide a device by means of which the hub can rotate faster than the axle or shaft.

Another object of my invention is to provide a device which is especially adapted to be used on automobiles, the object being to provide a device by means of which the outside wheel of an automobile when turning a corner will be allowed to revolve faster than the inside wheel so as to prevent skidding.

A further object of my invention is to provide a ball and socket locking device which will take the place of the differential gear now in use on automobiles and other vehicles, the ball and socket locking device being so constructed that it will allow the vehicle to be run forwardly and backwardly.

A still further object of the invention is to provide a pair of locking balls so mounted that when the wheel is being driven forwardly both of the balls will be in a locked position and when reversed one of the balls will be thrown out of engagement.

Another object of the invention is to provide a ball and socket locking device in which the balls are so mounted that when the hub of the wheel is rotated faster than the collar carrying the balls, the balls will be picked up by anchor shaped points formed on the collar which release the balls and allow the hub to rotate faster than the axle whereby when turning a corner the outside wheel will be allowed to rotate faster than the inside wheel and as soon as the machine is driven straight again, the balls will be locked.

A further object of the invention is to provide a ball and socket locking device which is exceedingly simple in construction and one which is composed of a very few parts which are so arranged that they are not likely to get out of order in use thereby overcoming the difficulties now existing with differential gears used on automobiles.

A still further object of my invention is to so construct the ball carrying collar that one of the balls used for driving the wheel forwardly will pass diagonally through the collar and assume a position to drive the wheel backwardly.

With these various objects in view, my invention consists in the novel features of construction, combination and arrangement of parts hereinafter fully described, pointed out in the claims and shown in the accompanying drawings, in which—

Figure 1 is a vertical section through a hub showing the balls in a locked position. Fig. 2 is a section taken on the line 2—2 of Fig. 1. Fig. 3 is a similar section showing the ball picked up by the anchor shaped point allowing the hub to rotate freely. Fig. 4 is a vertical section through the hub showing the ball in position to reverse the wheel. Fig. 5 is a plan view of the collar carried by the axle. Fig. 6 is a section through the fluted box. Fig. 7 is a section taken from the other side to that of Fig. 2.

In carrying out my improved invention, I employ a collar A which is adapted to be secured to the rear axle B of an automobile by pins A' and a key $A^2$ which securely locks the collar rigidly thereon so that when the axle is rotated the collar will be also rotated. The collar is provided with oblique grooves C and D forming shoulders C', D' and anchor shaped points $C^2$, $D^2$ for a purpose hereinafter fully described. An oblique groove or recess E is formed in the collar on the side with the recess or groove D and is also provided with a shoulder E' and an anchor shaped point $E^2$, the recess being connected to the recess C by a diagonal bore F for a purpose hereinafter fully described. Mounted on the axle B is a hub G of any suitable construction having a fluted box H provided with a flanged end H' and provided with an internally threaded portion $H^2$ in which is adapted to work an externally threaded nut or sleeve I.

Mounted in the groove or recess C is a locking ball J which is adapted to fit within one of the flutes of the box when in a normal position against the shoulder C' so that the wheel will be driven when the axle B is driven and arranged within the groove or recess D is an idle ball K which is also adapted to fit within a flute of the box when in a normal position so that when the wheel is being driven forwardly the hub will be locked to the collar by the balls, the grooves C and D being arranged in exactly the same position in the collar with respect to each other so that when the axle is being rotated in the direction to drive the wheel forward, the balls J and K will be in a locked position and when the axle is reversed so as to turn the wheel backwardly, the ball J will pass through the diagonal bore F into the oblique groove or recess E and drop into one of the flutes of the box and be engaged by the shoulder E' which locks it in a firm position so that the wheel can be driven backwardly without any danger of it slipping. When the axle is again driven forwardly the ball J will be picked up by the anchor shaped point E² and carried through the diagonal bore into the recess C where it will drop into the flute of the box and be engaged by the shoulder C'. The ball K will also drop in the same flute so as to form a double lock and when the wheel is being driven backwardly the ball K will pass into the bottom of the groove or recess and be held in that position until the wheel is again driven forwardly.

Assuming that the balls are in a locked position as clearly shown in Figs. 1 and 2 which shows the wheel being driven forwardly and when a corner is turned the outside wheel will rotate faster than the axle is being driven which forces the balls J and K up on the anchor shaped points C² D² thereby allowing the wheel to rotate independently of the collar, the balls being held out of engagement with the hub, and owing to the movement of the parts these balls are held in a neutral or inoperative position; that is they are prevented by centrifugal or other forces from passing through the collar to the opposite side. When all of the parts have assumed their normal conditions the balls will drop into their proper places and the wheel will be locked with reference to the axle.

While I have shown and described my improved ball and socket locking device especially adapted to be used on a hub for automobiles, it is of course understood that it can be used in connection with any driving means without changing the construction.

From the foregoing description, it will be seen that I have provided a differential hub which is operated by a ball and socket locking device so constructed that the hub will be locked in a rigid position on the axle when going straight and will be released when a corner is being turned, so as to allow the outside wheel to rotate faster than the inside wheel.

What I claim is:—

1. The combination with a power axle, of a collar fixed upon said axle provided with oblique recesses or grooves forming shoulders and anchor shaped points, said collar being provided with an oblique recess or groove connected to one of the first mentioned recesses or grooves by a diagonal bore a ball mounted in said recess or groove, an idler mounted in the other recess or groove and a hub provided with a fluted box mounted on said collar adapted to be locked in position to be driven forwardly or backwardly by the live ball.

2. In a device of the kind described, the combination with a power axle, of a collar fixed on said axle, oblique grooves or recesses being formed in said collar and a diagonal bore connecting said grooves or recesses, balls mounted in said recesses, one of said balls being adapted to pass through the bore, a hub mounted on the collar and provided with a fluted box adapted to be locked to said collar by said balls when in one position, and to be driven forwardly, and in reverse position to be driven backwardly.

3. In a device of the kind described, the combination with a power axle, of a collar secured on said axle, oblique recesses or grooves formed on opposite faces of said collar connected together by a diagonal bore, a fluted box carried by a hub mounted on said collar and a ball loosely mounted in said recesses for driving said hub in one direction when in one recess and for driving the hub in a reverse direction in the other recess.

4. In a device of the kind described, the combination with a power axle, of a collar fixed on said axle provided with oblique grooves or recesses forming shoulders and anchor shaped points, said recesses being connected together by a diagonal bore, a fluted box loosely mounted on said collar and a ball loosely mounted in said recesses for driving said fluted box in a forward or backward direction.

5. In a device of the kind described, the combination with a power axle provided with a collar, of a hub provided with a fluted box loosely mounted on said axle over said collar, said collar being provided with oblique recesses or grooves connected together by a diagonal bore, said recesses or grooves forming shoulders and anchor shaped points and a ball mounted in said recesses and grooves adapted to be locked in one of the flutes of the box by the shoulder of one of the recesses for driving said hub forwardly and by the shoulder of the other recess for driving said hub backwardly.

6. In a device of the kind described, the combination with a power axle, of a collar fixed on the axle provided with oblique recesses connected together by a diagonal bore forming shoulders and anchor shaped points, said collar being provided with an oblique recess forming a shoulder and anchor shaped point adapted to contain an idle ball, a hub mounted on the axle over said collar, a fluted box carried by the hub adapted to be engaged by the idle ball when being driven in a forward direction, a ball mounted in the recesses engaging said fluted box when being driven in a forward direction at the same time as the idle ball, said ball passing through the diagonal bore into the other recess and engaging the fluted box when being driven in the reverse direction.

GEORGE W. STANLEY.

Witnesses:
E. D. MORGAN,
DAWES TAYLOR.

---

Copies of this patent may be obtained for five cents each, by addressing the "Commissioner of Patents, Washington, D. C."